US010261899B2

(12) United States Patent
Otterstedt et al.

(10) Patent No.: US 10,261,899 B2
(45) Date of Patent: Apr. 16, 2019

(54) METHOD, DEVICE AND SYSTEM FOR DATA PROCESSING USING DEDICATED MAPPING BETWEEN LOGICAL AND PHYSICAL ADDRESSES

(71) Applicant: Infineon Technologies AG, Neubiberg (DE)

(72) Inventors: Jan Otterstedt, Unterhaching (DE); Stefan Rueping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 2 days.

(21) Appl. No.: 14/475,651

(22) Filed: Sep. 3, 2014

(65) Prior Publication Data

US 2016/0062886 A1    Mar. 3, 2016

(51) Int. Cl.
*G06F 12/02* (2006.01)

(52) U.S. Cl.
CPC .. *G06F 12/0292* (2013.01); *G06F 2212/7201* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 8,543,757 B2 * | 9/2013 | Gorobets | ............ | G06F 12/0246 711/103 |
| 8,996,796 B1 * | 3/2015 | Karamcheti | .......... | G06F 12/121 711/103 |
| 2004/0083335 A1 * | 4/2004 | Gonzalez | ............ | G06F 12/0246 711/103 |
| 2009/0070520 A1 * | 3/2009 | Mizushima | ......... | G06F 12/0246 711/103 |
| 2011/0145481 A1 * | 6/2011 | Yeh | ...................... | G06F 12/0246 711/103 |
| 2011/0231597 A1 * | 9/2011 | Lai | ...................... | G06F 12/0246 711/103 |
| 2013/0304973 A1 * | 11/2013 | Aso | ..................... | G06F 12/0246 711/103 |
| 2014/0208004 A1 * | 7/2014 | Cohen | ................. | G06F 12/0246 711/103 |
| 2014/0325117 A1 * | 10/2014 | Canepa | ............... | G06F 12/0246 711/103 |

* cited by examiner

*Primary Examiner* — Edward J Dudek, Jr.
(74) *Attorney, Agent, or Firm* — Schiff Hardin LLP (57) ABSTRACT

A method for data processing including mapping between a logical address and a physical address of a memory, wherein the memory comprises several pages, wherein a group of pages comprises at least one page that comprises at least two portions, and wherein the at least two portions of each page of the group are not part of a single-page logical address space.

17 Claims, 7 Drawing Sheets

METHOD, DEVICE AND SYSTEM FOR DATA PROCESSING USING DEDICATED MAPPING BETWEEN LOGICAL AND PHYSICAL ADDRESSES

BACKGROUND OF THE INVENTION

Embodiments of the present invention relate to an efficient utilization of processing data which may in particular be at least temporarily stored in a non-volatile memory (NVM). In this regard, methods are provided for operating and/or utilizing such NVM and according devices and systems are suggested.

SUMMARY

A first embodiment relates to a method for data processing comprising:
 mapping between a logical address and a physical address of a memory,
 wherein the memory comprises several pages,
 wherein a group of pages comprises at least one page that comprises at least two portions,
 wherein the at least two portions of each page of the group are not part of a single-page logical address space.

A second embodiment relates to a device for data processing comprising:
 a processing unit,
 a memory comprising several pages, wherein a group of pages comprises at least one page that comprises at least two portions,
 a mapping logic that is arranged for mapping a logical address of the processing unit to a physical address of the memory, wherein the at least two portions of each page of the group are not part of a single-page logical address space.

A third embodiment relates to a system comprising at least one device as described herein.

A fourth embodiment is directed to a device for data processing comprising:
 means for mapping between a logical address and a physical address of a memory,
 wherein the memory comprises several pages,
 wherein a group of pages comprises at least one page that comprises at least two portions,
 wherein the at least two portions of each page of the group are not part of a single-page logical address space.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Non-volatile memories (NVMs) can be programmed and erased by various software applications. The memory may be organized in a way that a group of bits are erased or programmed together. For example, a sector of the memory may be erased or programmed or a page of the memory may be erased or programmed. For example, the page may comprise several bits and the sector may comprise several pages.

It is noted that page may be any physical memory portion that can be erased together. The page may in particular be the smallest physical memory portion that is subject to an erase operation.

It is noted that the sector mentioned herein is an example of portions of a memory that can be erased, wherein the sector may comprise at least one bit, in particular several bits or several pages. The memory mentioned may in particular be a memory device.

Examples described herein may be applicable with regard to any device that has persistent and re-programmable memory, e.g., NAND/NOR Flash, RRAM, MRAM, FeRAM. They may also be applicable for hard drives.

Use cases may relate to scenarios with re-programmable firmware. Exemplary scenarios are: mobile phones, washing machines, engine control modules (e.g., in the automotive field), manufacturing robots in an assembly line, DVD players, game consoles, FPGA devices, etc.

There are conflicting requirements regarding a page size (or any memory size comprising at least one page) of a (e.g., embedded flash) non-volatile memory (NVM). Examples presented herein provide solution for these conflicting requirements.

On one hand, it is advantageous to increase the page size, i.e. to increase the number of bytes stored in one page, because this allows reducing the silicon area required. This may in particular apply for memory capacities above a certain threshold. Said threshold may depend on the technology and/or architecture of the memory device.

On the other hand, the page size defines the smallest number of bytes that can be erased at a time, i.e. all bytes of one page are and have to be erased together. However, some applications may require to, e.g., modify the content of only a single data byte, which then requires the following actions:
 (a) copy the content of the complete page to an intermediate buffer,
 (b) modify the data stored in the intermediate buffer, i.e. the single data byte to be modified,
 (c) erase the whole page, and
 (d) write the data from the intermediate buffer back to the (erased) page.

The larger a size of a page, the more time is required to perform steps (a) and (d). Step (c) may be independent from the size of the page. Hence, increasing the size of a page leads to an increase of time for said steps (a) and in particular (d), which may further lead to a delay that could be too high of an application requirement.

It is noted that the intermediate buffer may, e.g., be a random access memory (RAM) or a different page of the NVM; the choice for selecting such intermediate buffer may depend on application requirements.

It is noted that "page" as referred to herein may in particular be the smallest memory portion of the NVM that can be erased at once. This may in particular be the smallest memory portion that can be erased. However, the concept described herein may be accordingly applicable for other memory portions, e.g., sectors.

Examples presented herein may in particular apply for large pages. The size of a (large) page may be designed for a typical large portion of memory as it may be used (in a particular use case scenario or application) for any type of data, e.g., code, constant data and/or bulk data.

For such data that may be subject to being changed in a small granularity (e.g., bit-wise or byte-wise), a (e.g., software-based) solution may suggest using (only) a portion (e.g., half) of each page and ignoring the remaining portion of the page. Unfortunately, such solution bears the following disadvantages:

(1) A portion of the page and thus the memory is not used and thus "wasted".
(2) The overall logical address space of the usable memory has several non-used portions ("holes") which corresponds to a high degree of fragmentation and may be inconvenient to use.

According to an example, these disadvantages may be mitigated or avoided via, e.g., a hardware, e.g., a mapping logic, that performs a dedicated mapping of logical addresses (which are visible to the software) to physical addresses (which are employed by the memory hardware). In addition, such mapping logic can be configured to operate on a predetermined memory range. Hence, any separation into memory portions is largely flexible: The configuration can be adapted according to requirements of the application by configuring the hardware. An effective page size may be reduced by the configuration and the fragmentation may be minimized by avoiding clustering holes into one area of memory space.

Figure 1:
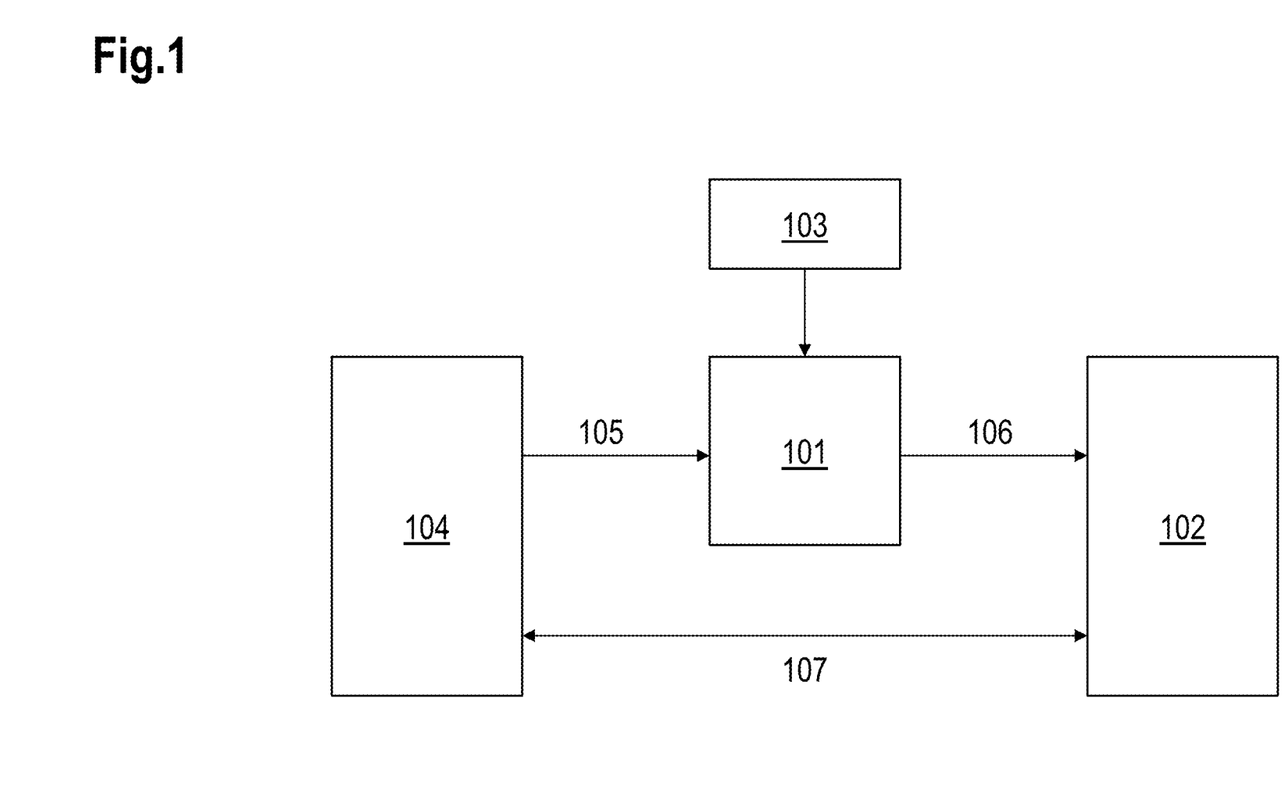
FIG. 1 shows a block diagram depicting an exemplary hardware structure for flexibly utilizing a memory.

FIG. 1 shows a block diagram depicting an exemplary hardware structure for flexibly utilizing a memory 102. The memory 102 may be a NVM. A processing unit 104, e.g., a microcontroller, a central processing unit or the like, may provide a logical address 105 to a mapping logic 101. The mapping logic 101 may be configured via a configuration control unit 103. Based on the logical address 105 and the configuration data supplied by the configuration control unit 103, the mapping logic 101 performs an address mapping resulting in a physical address 106 to access the memory 102. Based on the address mapping conducted by the mapping logic 101, data 107 can be conveyed between the processing unit 104 and the memory 102.

The configuration control unit 103 allows a flexible utilization of the memory 102. The configuration control unit 103 may configure memory portions of one or of various sizes, it may manage the locations of the memory portions of the physical memory 102. The configuration control unit 103 hence provides a service to the processing unit 104 as if the memory were a logically joined memory space that can be addressed in an efficient, e.g., non-fragmented, manner.

Hereinafter, several examples are described. Each page may be separated into several "units". As an example, the page can be equally (50%) split into two memory portions "part1" and "part2". However, this is only an exemplary embodiment chosen for the purposes of illustration. According to actual use-cases, various numbers of memory portions as well as different sizes of memory portions may be utilized following the concepts described herein.

According to examples, a partitioning amounting to 50%, 25%, 12.5%, etc. may be advantageous for implementation purposes. According to such examples the number of units stored in one page amounts to $2^n$, wherein n is an integer larger than or equal 1.

It is noted that said unit may be a byte (8 bits) or a word (16 bits) or any other amount of bits that can be logically linked.

Figure 2:
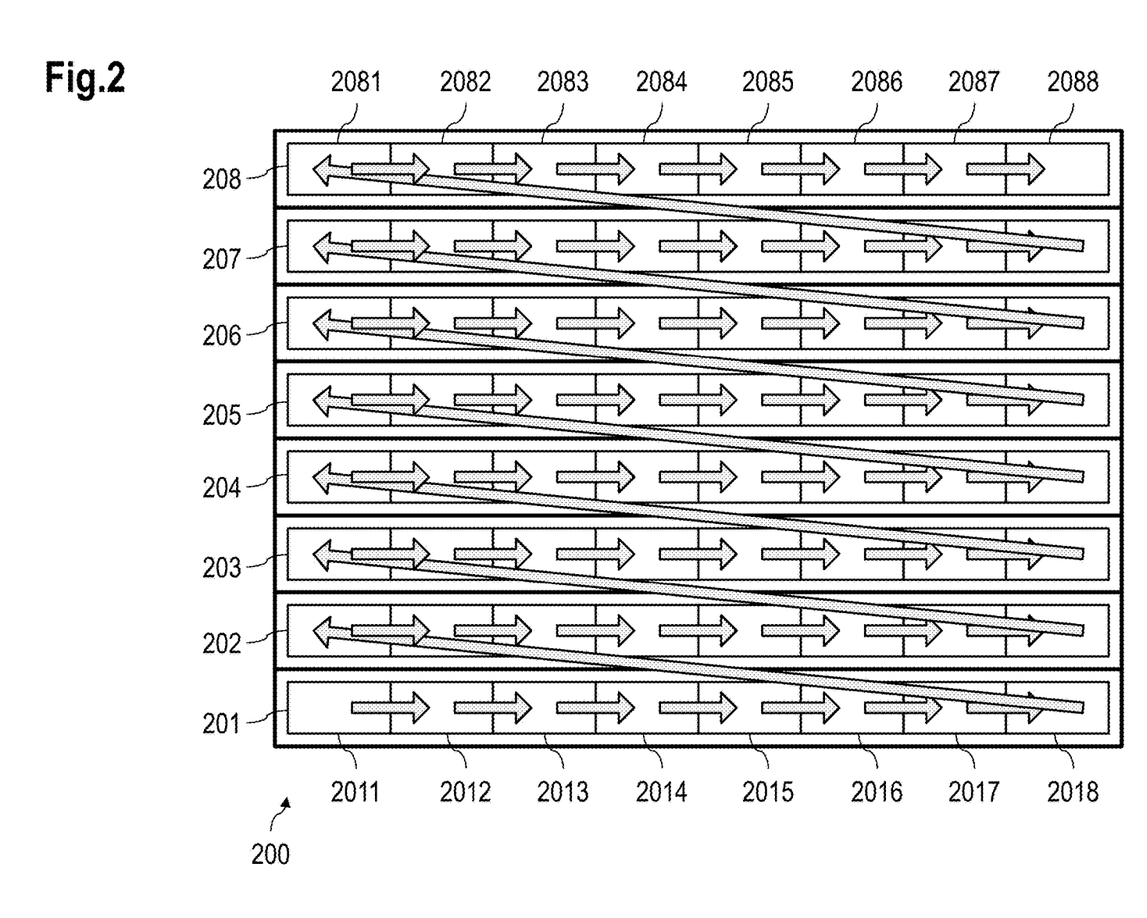
FIG. 2 shows an exemplary memory with several pages, wherein each page comprises 8 units.

FIG. 2 shows an exemplary memory 200 with pages 201 to 208. Each page 201 to 208 comprises 8 units, which is exemplarily shown for the page 201 comprising the units 2011 to 2018 and for the page 208 comprising the unit 2081 to 2088. Hence each page 20$i$ comprises the units 20$i$1 to 20$i$8, wherein i=1 . . . 8.

In normal operation of the memory 200, a logical address and a physical address are identical. Hence, a linearly incremented logical address leads to a similarly linearly incremented physical address, i.e. the memory range is processed unit by unit, page by page, starting with the first unit 2011 of page 201 to the last unit 2018 of page 201, continuing with the first unit 2021 of the page 202, etc.

Figure 3:
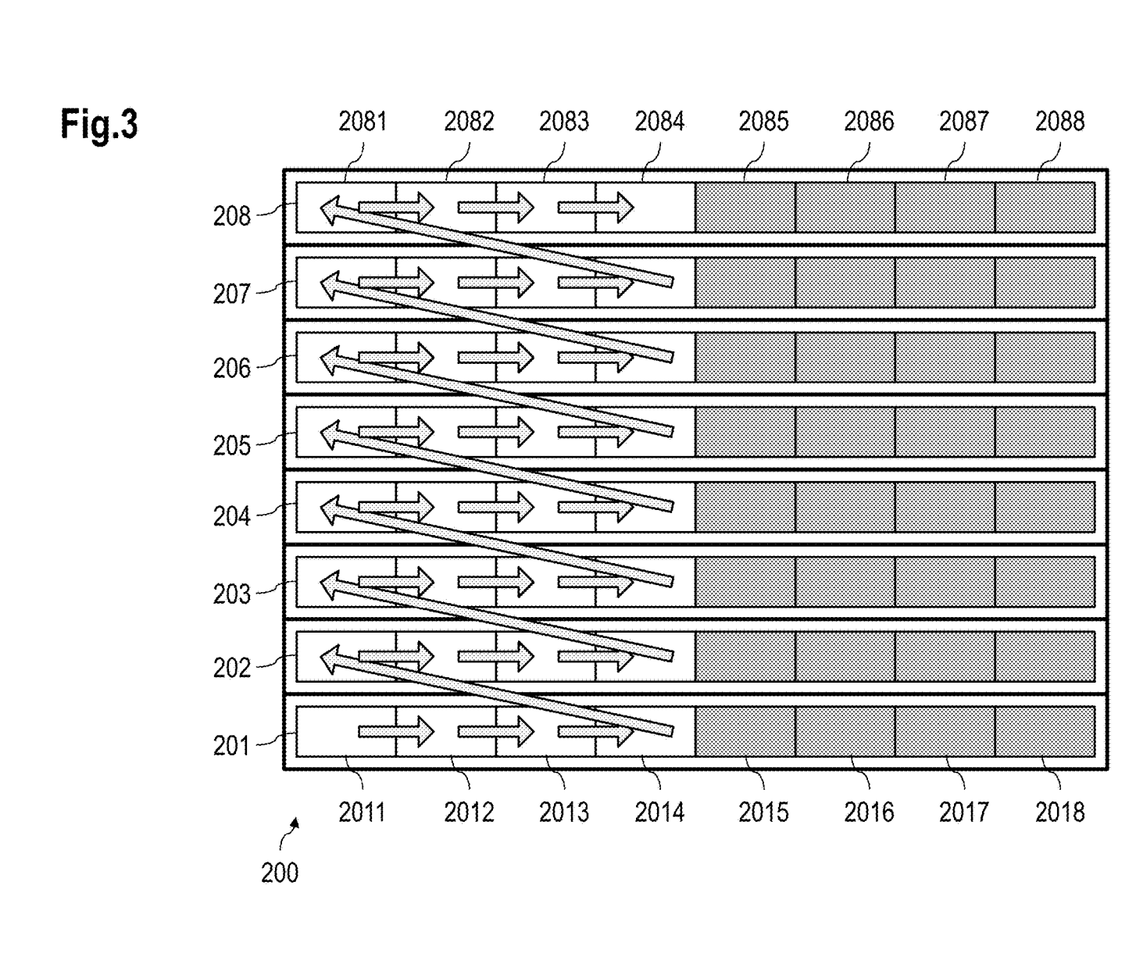
FIG. 3 shows the memory of FIG. 2, whereas, in contrast to FIG. 2, logical and physical addresses are not identical.

FIG. 3 shows the memory 200 of FIG. 2, whereas, in contrast to FIG. 2, logical and physical addresses are not identical.

After having reached the 4th unit 2014 of the page 201, a next increment of the physical address jumps to the 1st unit 2021 of the page 202, i.e. the second half of every page is not used. In this case, the first halves of the pages 201 to 208 constitute a continuous logical address range, whereas the second halves of the pages 201 to 208 are wasted and the memory effectively has a reduced logical address range. The address range is also referred to as address space.

Figure 4:
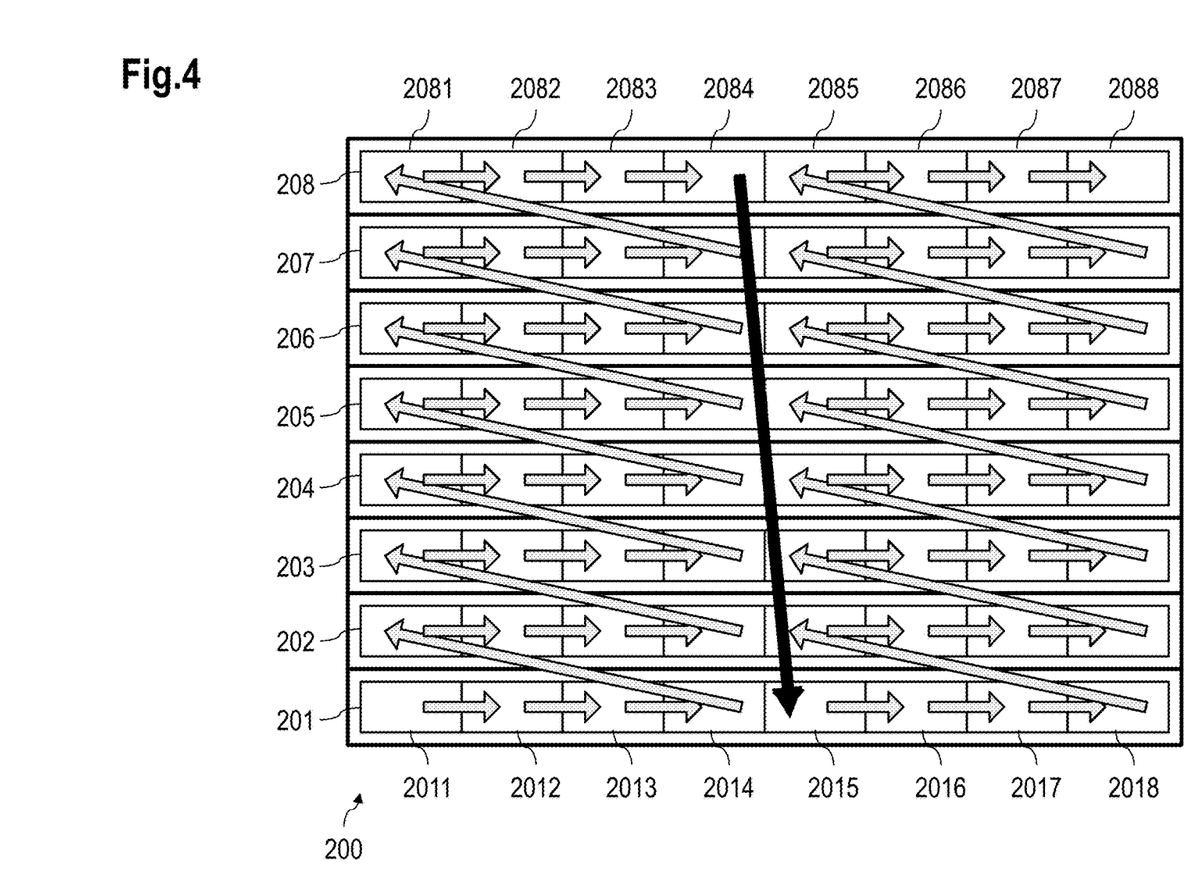
FIG. 4 shows the memory of FIG. 2, wherein the logical and physical addresses again are not identical; in contrast to the example shown in FIG. 3, the second halves of the pages are not wasted.

FIG. 4 shows the memory 200 of FIG. 2, wherein the logical and physical addresses again are not identical. However, in contrast to the example shown in FIG. 3, the second halves of the pages 201 to 208 are not wasted.

After having reached the 4th unit 2014 of the page 201, a next increment of the physical address jumps to the 1st unit 2021 of the next page 202. After having reached the 4th unit 2084 of the last physical page 208, a next increment of the physical address jumps to the 5th unit 2015 of the first page 201. After the 8th unit 2018 of the first page 201, the 5th unit 2025 of the second page 202 comes next, etc. until the 8th unit 2088 of the last page 208 is reached.

In this case, these second halves of the pages 201 to 208 are not "wasted", but have their own continuous logical address range. The memory effectively has the same overall logical address range, which is just mapped to the physical address range in a different way compared to the normal operation described with regard to FIG. 2.

Figure 5:
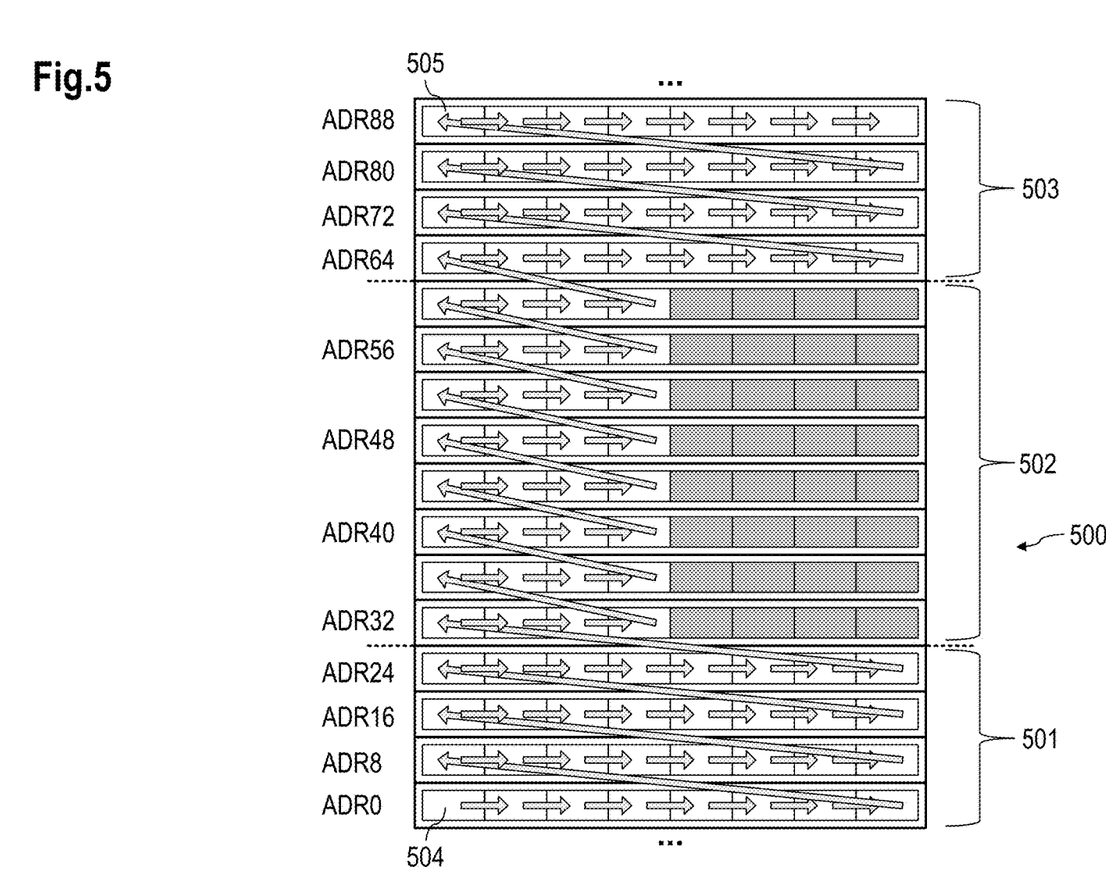
FIG. 5 shows a memory utilizing different mappings for different sections of the memory.

FIG. 5 shows a memory 500 utilizing different mappings for different sections 501, 502 and 503 of the memory.

In section 501 and 503 a full-page mapping is used as described with regard to FIG. 2 and in section 502 half pages are used as described with regard to FIG. 3.

Hence, the physical addresses may be mapped in a flexible way to logical addresses, wherein different sections of the memory 500 may be configured for different physical mappings (as described with regard to FIG. 1).

As the second halves of the pages in section 502 are wasted, the memory effectively has a smaller overall logical address range. In order to obtain an overall address range without any holes, the addresses of the normal address range located above the mapped address range may be shifted down logically to become directly attached to the reduced address space according to the mapping.

In the example shown in FIG. 5, the logical addresses may be mapped as shown by the reference ADR0 to ADR88, wherein ADR0 indicates the first unit 504 of the first usable 8 units and ADR88 indicates the first unit 505 of the last 8 usable units of the memory 500. Hence, the logical mapping ADR0 to ADR88 may vary from the otherwise physical mapping ADR0 to ADR120, because of the 32 unused units in section 502.

Figure 6:
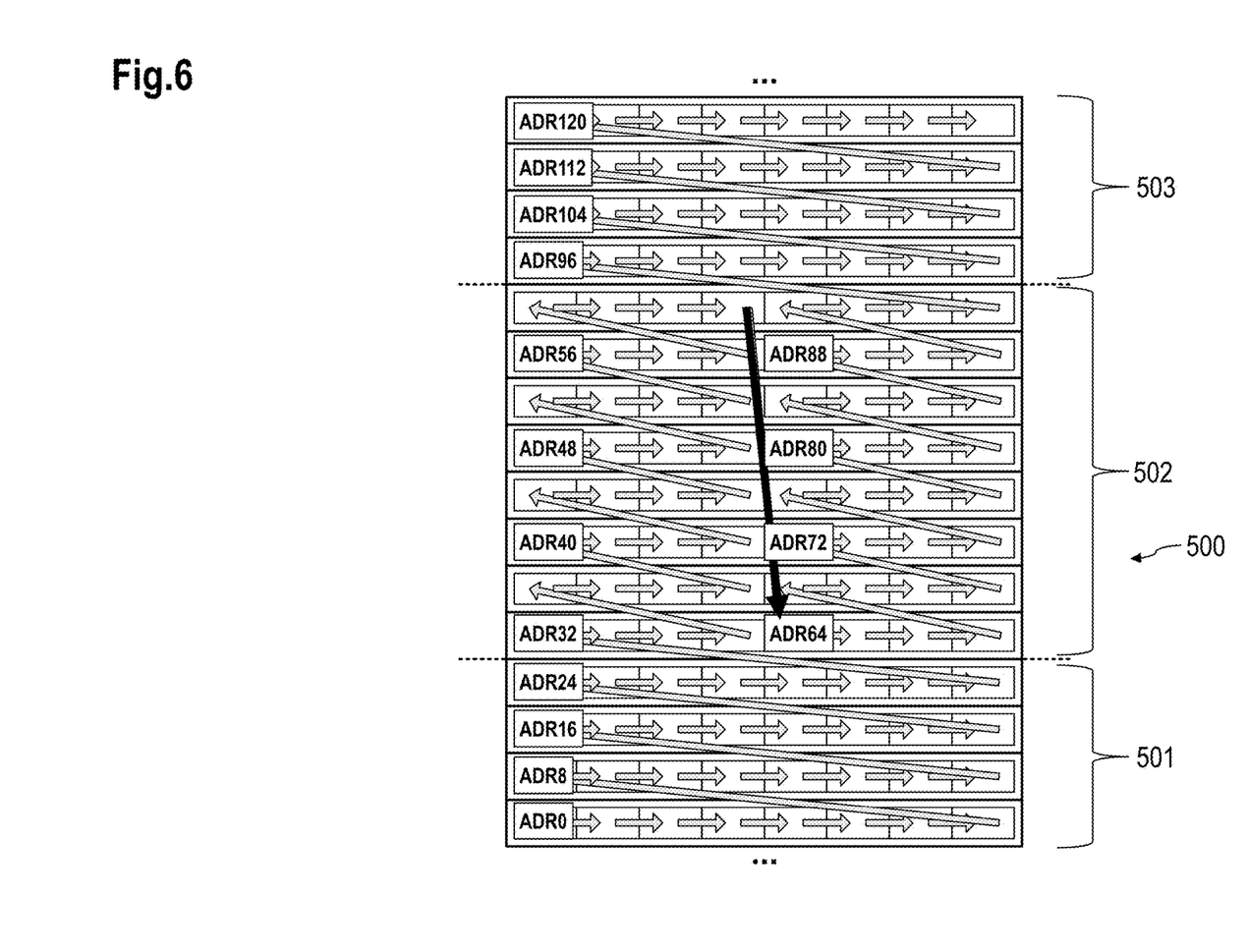
FIG. 6 shows the memory according to FIG. 5, wherein in contrast to the example shown in FIG. 5 the second halves of the middle section are not wasted.

FIG. 6 shows the memory 500 according to FIG. 5, wherein in contrast to the example shown in FIG. 5 the second halves of the section 502 are not wasted.

In section 501 and 503 a full-page mapping is used as described with regard to FIG. 2 and in section 502 the half pages are mapped as described with regard to FIG. 4.

In FIG. 6 the logical addressing scheme is shown by the enumerated references ADR0 to ADR120. In section 502, each page comprises two portions, wherein said two portions of one page are not part of the same single-page logical address space: A first logical address space of section 502 goes from ADR32 to ADR63 covering the first halves of the pages and a second logical address space of section 502 goes from ADR64 to ADR 95 covering the second halves of the pages. Hence, each page of the section 502 is part of the first and second address space.

Since the second halves of the pages of section 502 are addressable, the memory effectively has the same overall logical address space as in normal operation. The address range does not comprise any holes, no shifting of logical in view of physical addresses is required.

In the examples shown in FIG. 4 and FIG. 6, an erase operation applied to a page 201 to 208 of the memory 200 or to a page of the section 502 may affect (i.e. also erase) two half pages from a different logical address range.

A continuous logical address range comprising the first halves of the pages may be used to store (important) data and the other continuous logical address range comprising the second halves of the pages may be either left empty or it may be used for storing data that does not have to be copied in steps (a) and (d) as described above. In one example, the (e.g.) second halves of the pages may be used to store updated versions of the data stored in the first halves.

In case the number of units that are stored in one page is $2^n$ and the number of pages in the mapped range is $2^m$, the address mapping logic may be performed as follows: For an address within the relevant (mapped) logical address range, the mapping can be realized by merely swapping bits of the address. It is noted that m and n are integers lager than or equal 1.

Figure 7:
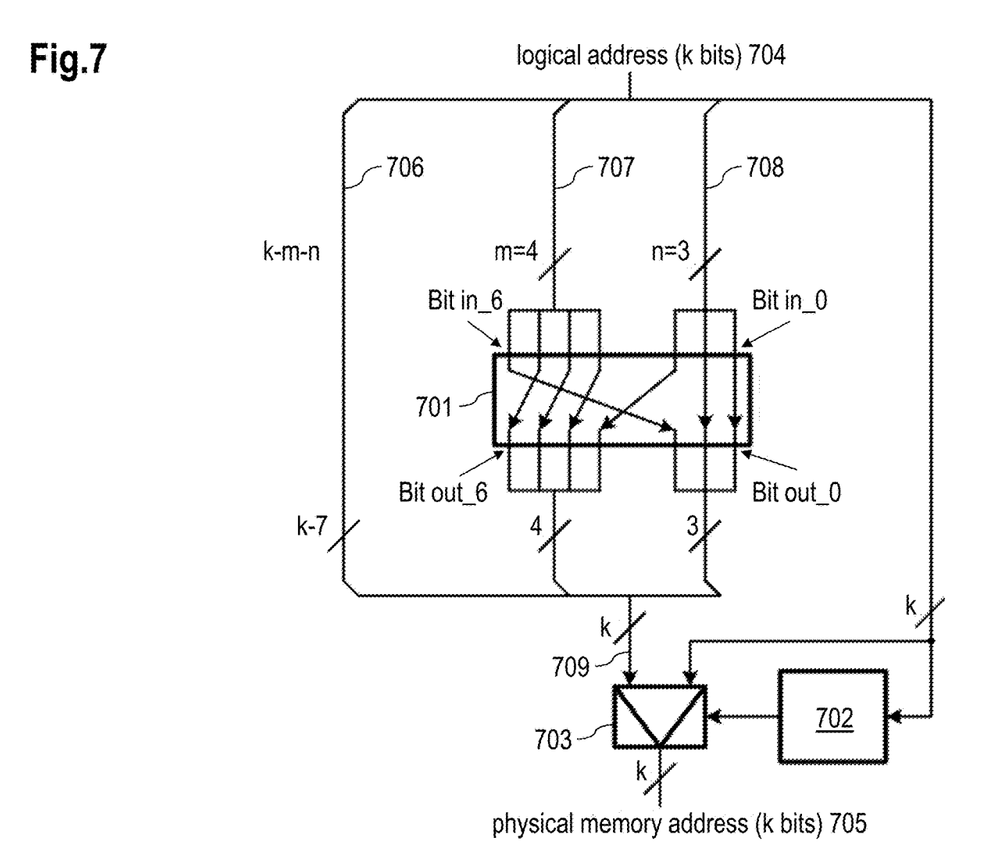
FIG. 7 shows a schematic diagram for efficiently mapping k logical address bits onto k physical memory address bits.

FIG. 7 shows a schematic diagram for efficiently mapping k logical address bits onto k physical memory address bits. In the example shown in FIG. 7, a partitioning of the pages amounts to 50%, the number of units stored in one page is $2^3=8$ and the number of pages in the mapping range is $2^4=16$.

A logical address 704 comprises k bits. A logical page address 707 comprising m=4 bits of the logical address 704 is conveyed to a bit swapping unit 701. A logical unit address 708 comprising n=3 bits of the logical address 704 is also conveyed to the bit swapping unit 701. The bit swapping unit 701 maps the logical page address 707 and the logical unit address 708 towards the physical memory address. For illustration purposes, the bits at one side of the bit swapping unit 701 are enumerated in_0 to in_6 and the bits at the other side (towards the physical memory) are enumerated out_0 to out_6. The bits in_0 to in_2 correspond to the logical unit address 708 and the bits in_3 to in_6 correspond to the logical page address 707. The bit in_2 is the most significant bit (MSB) of the logical unit address 708 and the bit in_6 is the MSB of the logical page address 707.

The mapping provided by the bit swapping unit 701 is as follows:
  The bits in_0 and in_1 are mapped to the bits out_0 and out_1.
  The bit in_2 is mapped to the bit out_3.
  The bit in_3 is mapped to the bit out_4.
  The bit in_4 is mapped to the bit out_5.
  The bit in_5 is mapped to the bit out_6.
  The bit in_6 is mapped to the bit out_2.

Additional other address lines 706 amounting to k-m-n bits (here: k-7 bits) are not processed by the bit swapping unit 701. The output of the bit swapping unit 701 and the other address lines 706 hence provide k bits that are fed to a first input of a multiplexer 703. These k bits are referred to as mapped physical address 709. Also, the k bits of the logical address 704 are fed to a second input of the multiplexer 703. The logical address 704 is also conveyed to an address range check unit 702, which determines whether the bit swapping is to be conducted for the current logical address 704. If so, the address range check unit 702 controls the multiplexer 703 such that the mapped physical address 709 is used as physical memory address 705. Otherwise, the logical address 704 is selected by the address range check unit 702 via the multiplexer 703.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for data processing comprising:
  mapping between a logical address and a physical address of a memory,
  wherein the memory comprises several pages,
  wherein a group of pages comprises at least one page that comprises at least two portions,
  wherein the at least two portions of each page of the group are not part of a single-page logical address space.

Hence, the examples provided herein allow in particular a mapping from a logical to a physical address (and vice versa), wherein several portions (at least two), also referred to as "units", of a single page may share different logical address spaces. Instead, there may be an offset in the logical address space between said portions of the page.

The single-page logical address space may in particular be a contiguous address space of a single page: the page may comprise several units; the single-page logical address space starts with the first and ends with the last unit of the page.

It is noted that page may be any physical memory portion that can be erased together. The page may in particular be the smallest physical memory portion that is subject to an erase operation.

There may be at least one group of pages, wherein each page of the respective group is divided into at least two portions. The memory may in particular comprise several such groups, wherein each group may have the same or different separations of their respective page(s) into units. There may also be one group comprising at least one page, wherein said at least one page is not divided into portions.

In an embodiment, the memory is a non-volatile memory.

The memory may in particular be or comprise an embedded flash non-volatile memory (NVM).

In an embodiment, the page is a section of the memory that can be erased by a single erase operation.

In an embodiment, the page is the smallest contiguous section of the memory that is subject to a single erase operation.

Hence, the smallest contiguous section of the memory that can be erased by a single erase operation may be referred to as page.

It is noted that a modify operation may comprise an erase operation and a write operation (for the memory portion, in particular the (at least one) page).

In an embodiment, several groups are provided, each comprising at least one page.

In an embodiment, at least one portion of each page of the group is not used.

The group of pages may be separated into at least two portions. Each portion of all pages of said group may be combined to one contiguous logical memory space. Hence, if each page of the group is divided into i portions, there will be i contiguous logical memory spaces for the group. The i contiguous logical memory spaces may be logically attached to one another to span a combined contiguous logical memory space.

In an embodiment, at least one portion of each page of the group is used for storing data that does not have to be copied to an intermediate memory when the page is erased or modified.

It is in particular an option to not use at least one of the portion of each page of the group. This allows reducing the computation efforts for modifying the page, because a reduced amount of copy and write operations are required compared to the scenario when all portions of the page are used. This may advantageously reduce the processing delay, which may be useful in case many modify operations are to be conducted on such group or in particular page of the group.

In an embodiment, at least one portion of each page of the group is used for storing an updated version of data that is stored in at least one other portion this page.

Hence, an update can be efficiently conducted by selecting the latest data without having to modify the page (and hence conduct time-consuming operations including erasing and (at least partially) re-writing the page).

For example, if a page is divided into two portions, a first portion may comprise data which is at some point updated by writing the first update to the second portion. The software may from thereon use the updated data in the second portion. If another (second) update is required, the second update of the data is written to the first (or second) portion after the page has been erased; in this case, only one portion of the page is written by the second update, the other may remain empty for, e.g., a subsequent (third) update of the data.

In an embodiment, each of the at least two portions of each page of the group is part of a separate contiguous logical address space.

In an embodiment, separate contiguous logical address spaces are combined to a contiguous logical address space.

In an embodiment, the method further comprises:
mapping between a logical address and a physical address of a memory by swapping bits between the logical address and the physical address.

In addition, a device is provided for data processing, the device comprising:

a processing unit,
a memory comprising several pages, wherein a group of pages comprises at least one page that comprises at least two portions,
a mapping logic that is arranged for mapping a logical address of the processing unit to a physical address of the memory, wherein the at least two portions of each page of the group are not part of a single-page logical address space.

In an embodiment, the device further comprises a configuration control unit that is arranged for configuring the mapping logic.

In an embodiment, the mapping logic comprises a bit swapping unit that is arranged for swapping bits between the logical address and the physical address.

In an embodiment, the mapping logic comprises a bit swapping unit that is arranged for swapping m bits of a logical page address and n bits of a logical unit address to obtain the physical address.

In an embodiment, the device is implemented in one of the following:
a smartcard;
a subscriber identity module;
an access card;
an electronic payment device;
a passport;
an identification medium or device;
an authentication device;
a microcontroller;
a microprocessor;
an application-specific integrated circuit.

The application-specific integrated circuit is also referred to as ASIC.

Further, a system is provided comprising at least one device as described herein.

In an embodiment, the system is at least one of the following:
a communication system;
a mobile phone;
a household appliance;
an engine control module;
a manufacturing device;
a robot;
an entertainment device.

Also, a device is suggested for data processing, the device comprising:
means for mapping between a logical address and a physical address of a memory,
wherein the memory comprises several pages,
wherein a group of pages comprises at least one page that comprises at least two portions,
wherein the at least two portions of each page of the group are not part of a single-page logical address space.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for data processing, comprising:
mapping between a logical address and a physical address of a memory comprising a plurality of pages, a page being a smallest contiguous physical section of the memory erasable by a single erase operation and configured to store $2^n$ memory units, where n is an integer greater than or equal to one,
wherein the logical address and the physical address have a fixed relationship that does not change, and at least one page of the plurality of pages comprises at least two physical memory portions that are not part of a single-page contiguous logical address range.

2. The method according to claim 1, wherein the memory is a non-volatile memory.

3. The method according to claim 1, wherein the memory comprises a plurality of groups of pages, each group comprising at least one page.

4. The method according to claim 1, wherein at least one of the physical memory portions of the at least one page is not used.

5. The method according to claim 1, wherein at least one of the physical memory portions of the at least one page stores data that does not need to be copied to an intermediate memory when the at least one page is erased or modified.

6. The method according to claim 1, wherein at least one of the physical memory portions of the at least one page stores an updated version of data that is stored in another of the physical memory portions of the at least one page.

7. The method according to claim 1, wherein each of the physical memory portions of the at least one page is part of a separate contiguous logical address space.

8. The method according to claim 7, wherein the separate contiguous logical address spaces are combined into a contiguous logical address space.

9. The method according to claim 1, wherein the mapping between the logical address and the physical address is performed by swapping bits between the logical address and the physical address.

10. A device for data processing, comprising:
a processor;
a memory comprising a plurality of pages, a page being a smallest contiguous physical section of the memory erasable by a single erase operation and configured to store $2^n$ units, where n is an integer greater than or equal to one, and at least one page of the plurality of pages comprises at least two physical memory portions that are not part of a single-page contiguous logical address range; and
a mapping logic configured to map a logical address of the processor to a physical address of the memory, wherein the logical address and the physical address have a fixed relationship that does not change.

11. The device according to claim 10, further comprising:
a configuration controller configured to configure the mapping logic.

12. The device according to claim 10, wherein the mapping logic comprises a bit swapper configured to swap bits between the logical address and the physical address.

13. The device according to claim 10, wherein the mapping logic comprises a bit swapper configured to swap m bits of the logical address and n bits of a logical memory unit address to obtain the physical address.

14. The device according to claim 10, wherein the device is implemented in one of the following:
a smartcard;
a subscriber identity module;
an access card;
an electronic payment device;
a passport;
an identification medium or device;
an authentication device;
a microcontroller;
a microprocessor; and
an application-specific integrated circuit.

15. A system comprising at least one device according to claim 10.

16. The system according to claim 15, wherein the system is at least one of the following:
a communication system;
a mobile phone;
a household appliance;
an engine control module;
a manufacturing device;
a robot; and
an entertainment device.

17. A non-transistory computer readable storage medium directly loadable into a memory of a digital processor, comprising software code for performing the method according to claim 1.

* * * * *